United States Patent [19]

Ooka et al.

[11] Patent Number: 5,224,742
[45] Date of Patent: Jul. 6, 1993

[54] METHOD FOR CUTTING OFF WATER IN PIPELINE AND STRUCTURE OF CONNECTION PORTION IN PIPELINE

[75] Inventors: Sinkiti Ooka; Yukio Suzuki; Hisashi Kitajima; Hidehiro Noda, all of Tokyo, Japan

[73] Assignees: Toa Grout Kogyo Kabushiki Kaisha; Kabushiki Kaisha Iseki Kaihatsu Koki, both of Tokyo, Japan

[21] Appl. No.: 730,939

[22] PCT Filed: Feb. 13, 1991

[86] PCT No.: PCT/JP91/00171

§ 371 Date: Jul. 29, 1991

§ 102(e) Date: Jul. 29, 1991

[87] PCT Pub. No.: WO91/12460

PCT Pub. Date: Aug. 22, 1991

[30] Foreign Application Priority Data

Feb. 15, 1990 [JP] Japan ................ 2-32367
Nov. 22, 1990 [JP] Japan ............. 2-121842[U]

[51] Int. Cl.⁵ ............................................ F16L 41/08
[52] U.S. Cl. .................................... 285/156; 285/162; 285/214; 138/98; 29/890.148; 405/157
[58] Field of Search ............... 405/154, 157, 269; 138/97, 98; 285/162, 156, 214; 29/890.148, 507

[56] References Cited

U.S. PATENT DOCUMENTS

| 735,078 | 8/1903 | Felsing et al. ............... 138/98 |
| 4,018,459 | 4/1977 | Mominee et al. ............ 285/200 |
| 4,613,168 | 9/1986 | Smith et al. ................. 285/156 |
| 4,647,072 | 3/1987 | Westman .................... 138/97 |
| 4,740,017 | 4/1988 | Grabowski ................. 285/156 |
| 4,858,966 | 8/1989 | Ciriscioli et al. ............. 285/200 |
| 4,931,119 | 6/1990 | Watkins .................. 29/890.148 |
| 5,035,539 | 7/1991 | Kawafuji et al. ............. 138/97 |
| 5,042,532 | 8/1991 | Gilleland .................... 138/98 |
| 5,096,332 | 3/1992 | Kawafuji ................... 405/157 |
| 5,119,862 | 6/1992 | Maimets et al. .............. 138/98 |

FOREIGN PATENT DOCUMENTS

| 147724 | 12/1951 | Australia . |
| 8911617 | 12/1989 | Fed. Rep. of Germany . |
| 167193 | 7/1988 | Japan . |
| 192524 | 8/1989 | Japan ...................... 138/97 |
| 1-234690 | 9/1989 | Japan . |
| 2102024 | 4/1990 | Japan ...................... 138/97 |
| 2103124 | 4/1990 | Japan ...................... 138/97 |
| 9005267 | 5/1990 | PCT Int'l Appl. ............ 138/97 |
| 2041147 | 9/1980 | United Kingdom ........... 138/98 |

OTHER PUBLICATIONS

Supplementary European Search Report for EP 91 90 3820, May 25, 1992.

*Primary Examiner*—Eric K. Nicholson
*Attorney, Agent, or Firm*—Stoel Rives Boley Jones & Grey

[57] ABSTRACT

A cut-off material is provided, which includes an impermeable cutoff member (10, 70) provided with an expandable hose portion (18, 72) and a flange portion (20, 74) formed integrally with one end of the hose portion. The cutoff member is disposed in first and second pipelines, so that the flange portion is positioned within the first pipeline (12) and that the hose portion is positioned within the second pipeline (14). The cut-off member is maintained, for example, by a base (24,54,82) that is wound to be radially expandable, so that the flange portion is brought into liquid tight contact with the inner surface of the first pipeline and the hose portion extends within the second pipeline.

9 Claims, 11 Drawing Sheets

METHOD FOR CUTTING OFF WATER IN PIPELINE AND STRUCTURE OF CONNECTION PORTION IN PIPELINE

TECHNICAL FIELD

This invention relates to a method for water cut-off in a portion connecting a first pipeline to a second pipeline which branches off from the first pipeline, a structure of the connection portion for water cut-off, and a cut-off material.

BACKGROUND ART

A first pipeline, such as a main sewer pipe, is generally bonded in a liquid tight manner to a second pipeline, such as a branch pipe, at a portion connecting the two pipelines by means of a bonding agent such as mortar. In general, the bonding agent may be removed from the first or second pipelines by only slightly relatively displacing the pipelines. As a result, a space is formed in the connection portion, and the liquid tightness of the connection portion is lowered. A cut-off treatment is performed to prevent water leakage from the space formed in the connection portion.

This water cut-off is generally accomplished by a chemical feeding method involving the injection of a cut-off agent of cement or liquid type into the space and around the connection portion followed by coagulation of the cut-off agent.

When water leakage occurs in practice, the cut-off agent is diluted with water, flows into the pipeline and frequently fails to harden. Consequently, subsequent treatment for removing the cut-off agent that has entered the pipeline should also be conducted.

In the chemical feeding method using a cement-type cut-off agent, the hardened cut-off agent does not exhibit elasticity. When the pipes are displaced due to vibration, land subsidence or the like, the hardened cut-off agent peels from the pipeline, and cracks form in the hardened cut-off agent. As a result, long-term, stable water cut-off is not expected In the chemical feeding method using a liquid-type cut-off agent, the mechanical strength of the cut-off agent is low. The water cut-off is therefore not stably maintained for a long period of time.

SUMMARY OF THE INVENTION

An object of the present invention is to provide a cut-off method for a connection portion that does not employ a cut-off agent, a structure of the connection portion in the pipeline and a cut-off material.

According to the present invention, a method for water cut-off for a portion connecting a first pipeline to a second pipeline which branches off from the first pipeline includes the steps of: disposing an impermeable cut-off member having an expandable hose portion and a flange portion formed integrally with one end of the hose portion in the first and second pipelines, so that the flange portion is positioned within the first pipeline and the hose portion is positioned within the second pipeline; and maintaining the cut-off member so that the flange portion is brought into liquid tight contact with the inner surface of the first pipeline, and the hose portion extends within the second pipeline.

A structure of a portion connecting a first pipeline to a second pipeline which branches off from the first pipeline according to the present invention includes an impermeable cut-off member having an expandable hose portion and a flange portion formed integrally with one end of the hose portion. The flange portion is brought into liquid tight contact with the inner surface of the first pipeline, and the hose portion is disposed to extend within the second pipeline.

A cut-off material used for water cut-off for a portion connecting a first pipeline to a second pipeline which branches off from the first pipeline according to the present invention includes an impermeable cut-off member provided with an expandable hose portion and a flange portion formed integrally with one end of the hose portion.

The cut-off member is disposed from the inside of the first pipeline or from the upper end of the second pipeline, so that the flange portion is positioned within the first pipeline and the hose portion extends within the second pipeline. The liquid tightness between the flange portion and the first pipeline is maintained by bringing the flange portion into liquid tight contact with the inner surface of the first pipeline. The liquid tightness between the hose portion and the second pipeline is maintained by extending the hose portion higher than the groundwater level within the second pipeline.

According to the present invention, the water leakage from the connection portion in the pipeline is prevented without using a cut-off agent for closing the space formed in the connection portion.

As means for maintaining the cut-off member such that the flange portion is brought into liquid tight contact with the inner surface of the first pipeline, a sheet-like base that is cylindrically wound to be radially expandable may be used. In this case, the base is disposed within the first pipeline and subsequently radially expanded. Accordingly, the flange portion is pressed against the inner surface of the first pipeline by the base. The base is maintained in the radially expanded configuration by engaging a plurality of engaging portions provided on the base with each other, and, as a result, the flange portion is maintained in liquid tight contact with the inner surface of the first pipeline.

As the maintaining means, a sheet-like base and an elastically deformable sleeve may be used. In this case, the base is disposed within the first pipeline together with the sleeve, such that the base is disposed within the sleeve in a radially expandable, cylindrically wound condition, and is subsequently radially expanded. In this manner, the flange portion is pressed by the base and the sleeve against the inner surface of the first pipeline. The base is maintained in the radially expanded condition by engaging a plurality of engaging portions provided on the base with each other, and, as a result, the flange portion is maintained in liquid tight contact with the inner surface of the first pipeline.

When using either maintaining means, it is preferable that a recess, which receives the sleeve and the base therein so that the sleeve and the base do not protrude from the inner surface of the first pipeline, be formed on the inner surface of the first pipeline, before disposing the cut-off material.

In the cut-off material according to the present invention, it is preferable that the flange portion has a plurality of projections formed on at least one of the below surfaces selected from the surface located at the side of the hose portion and the surface opposite thereto. In this way, the projections are mainly deformed elastically when the sheet-like base is radially expanded within the first pipeline, and the flange portion is pressed by the base against the inner surface of the first pipeline.

When the projections are formed on the surface opposite to the surface located at the side of the hose portion, the liquid tightness between the inner surface of the first pipeline and the flange portion is maintained by pressing the flange portion against the inner surface of the first pipeline, such that the projections are maintained in the elastically deformed condition.

When the projections are formed on the surface at the side of the hose portion, the liquid tightness between the inner surface of the first pipeline and the flange portion is maintained by pressing the projections against the inner surface of the first pipeline, such that the projections are maintained in the elastically deformed condition.

In either case, the space between the second pipeline and the hose portion is maintained in liquid tightness by extending the hose portion higher than a ground water level.

It is preferable that the projections are annular projections and continuously extend around the axis of the hose portion. Since the contact portions between the flange portion and the inner surface of the first pipeline extend continuously around the axis of the hose portion, the liquid tightness between the flange portion and the inner surface of the first pipeline is maintained more firmly.

The cut-off material may further include a sheet-like base disposed within the first pipeline in a radially expandable, cylindrically wound configuration for maintaining the flange portion pressed against the inner surface of the first pipeline when expanded. In this case, the base member has engaging portions that may be engaged with each other to maintain the base in the radially expanded condition.

Alternatively, the cut-off material may further include an elastically deformable sleeve disposed within the first pipeline, and a sheet-like base disposed within the sleeve in a cylindrically wound configuration to be radially expandable for maintaining the flange portion pressed against the inner surface of the first pipeline through the sleeve. In this case, the base has engaging portions that may be engaged with each other to maintain the base in the radially expanded condition.

The hose portion may include an expandable base material impregnated with a resin that is hardened by heat or light. In addition, the flange portion may be provided with a main portion formed by extending the end of the hose portion in the radial direction, and an elastically deformable auxiliary member mounted on the main portion at the side of the hose portion. In this case, the projections are formed integrally with the auxiliary member.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE INVENTION

Figure 1:
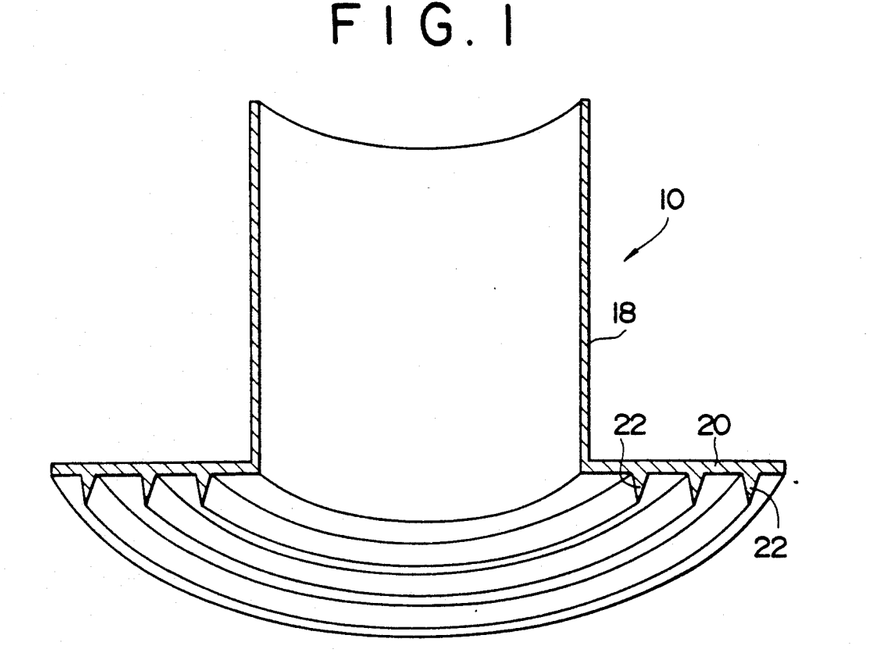
FIG. 1 is a cross-sectional view showing an embodiment of a cut-off member according to the present invention.
Figure 2:
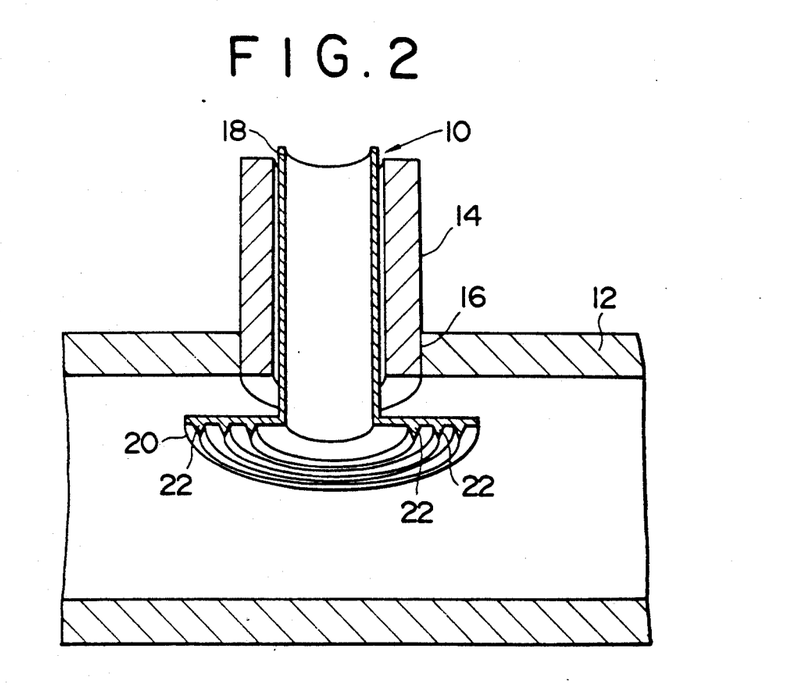
FIG. 2 is a cross-sectional view of a pipeline having the cut-off member shown in FIG. 1 disposed therein.

A cut-off member 10 shown in FIGS. 1 and 2 is used for the prevention of water leakage from a portion 16 connecting a first pipeline 12 embedded in the ground to a second pipeline 14 which branches off from the first pipeline. In the illustrated embodiment, the first pipeline 12 and the second pipeline 14 are, respectively, a main pipe and a branch pipe laid in the ground. The first pipeline 12 may, however, be a pipeline composed of the main pipe that has already been installed and a coating pipe formed at the inside of the main pipe, i.e., a repair pipe portion.

The cut-off member 10 has an expandable hose portion 18 and an elastically deformable flange portion 20 formed integrally with one end of the hose portion. The hose portion 18 has an outer diameter approximately equal to the inner diameter of the second pipeline 14, where the hose portion is preferably placed. Further, the hose portion 18 has a longer length than that of the second pipeline 14, and is made of either a thermosetting or a photohardening synthetic resin.

However, the hose portion 18 may be composed of an expandable base material composed of fabrics, knittings, sponge-like raw materials or the like into a hose-like form and impregnated with either a thermosetting or a photohardening synthetic resin.

The flange portion 20 has an outer diameter larger than that of the second pipeline 14 and, further, has a thickness slightly larger than the thickness of the hose portion 18. The flange portion 20 has a plurality of projections 22 extending continuously around the axis of the hose portion 18 and formed on the surface opposite to the surface at the side of the hose portion 18.

The thickness of the hose portion 18 and the flange portion 20 may be approximately equal to each other as shown in the illustrated embodiment, or different from each other. In particular, it is preferable that the thickness of the hose portion 18 is smaller than that of the flange portion 20.

Figure 3:
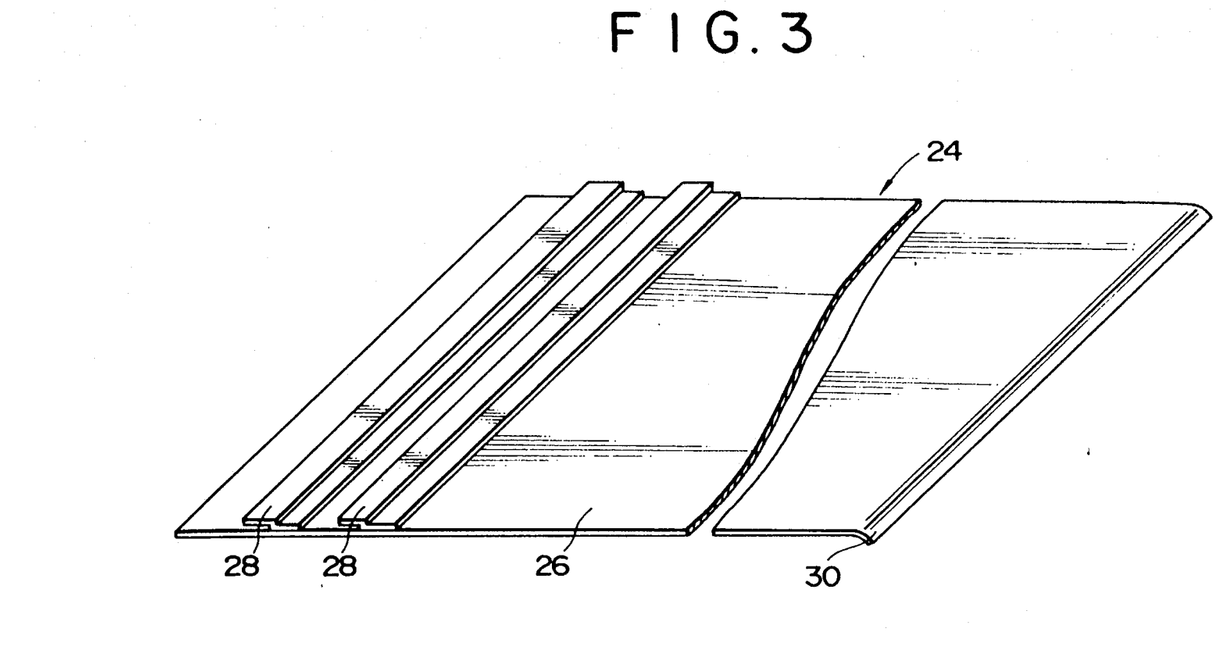
FIG. 3 is a perspective view developing and showing an embodiment of a base used together with the cut-off member shown in FIG. 1.

Furthermore, a sheet-like base 24 shown in FIG. 3 is used to prevent water leakage from the connection portion 16. The base 24 has an elastically deformable sheet portion 26; a plurality of female engaging portions 28 formed at one end of the sheet portion; and a male engaging portion 30 formed at the other end of the sheet portion 26 and capable of engaging with the female engaging portions 28.

In the illustrated embodiment, the female engaging portions 28 are composed of elongate metal fittings 30 having a Z-letter cross-sectional shape and fixed to the sheet portion 26. The male engaging portion 30 constitutes the other end of the sheet portion 26 and is bent toward the surface opposite to the surface provided with the female engaging portions 28.

The thickness of the hose portion 18, the thickness of the flange portion 20, the height of the projection 22, and the thickness of the base 24 are defined as 0.2 to 5 mm, 1 to 6 mm, 4 to 8 mm and 0.5 to 3 mm, respectively, for example.

It is preferable that the cut-off member 10 is made of a polymeric material, such as a synthetic resin or rubber. On the contrary, it is preferable that the base 24 is made of a metal material, such as stainless steel, copper, or copper alloy with corrosion resistance or a synthetic material such as vinyl chloride.

Figure 4:
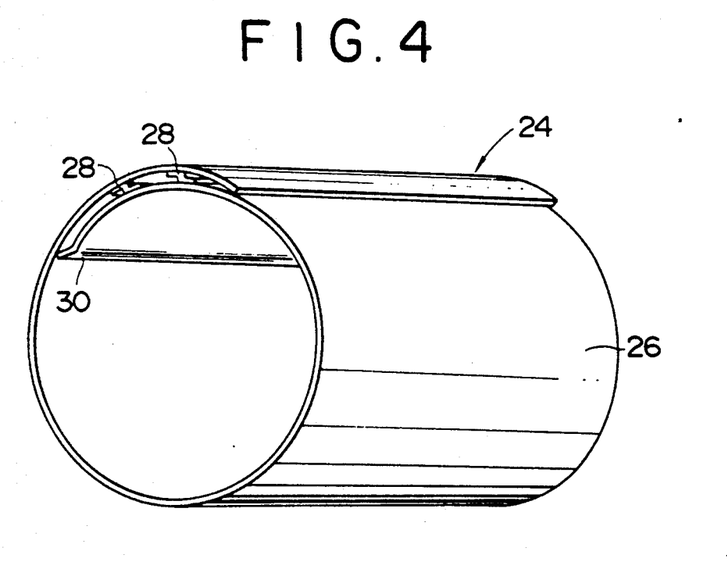
FIG. 4 is a perspective view showing the cylindrically wound condition of the base shown in FIG. 3.

As shown in FIG. 4, the base 24 is preliminarily wound into a spiral form or a cylindrical form so that the end at the side of the female engaging portions 28 of the sheet portion 26 is disposed outside the end at the side of the male engaging portion 30.

Prior to water cut-off treatment, the first pipeline 12 and the inside of the second pipeline 14 are cleaned.

The cut-off member 10 is then inserted into the second pipeline 14 from the inside of the first pipeline 12 or from the upper end of the second pipeline 14, so that the flange portion 20 is positioned within the first pipeline 12, and the hose portion 18 extends within the second pipeline 14.

The cut-off member 10 can be placed inside the first pipeline 12 by inserting the cut-off member 10 into the second pipeline 14 until a part of the hose portion 18 protrudes upward from the second pipeline 14 using a fluid such as compressed air, for example, when the other end of the hose portion 18 is closed.

The cut-off member 10 may also be placed by folding the flange portion 20, for example, to a size permitting the flange portion to pass through the inside of the second pipeline 14; pushing the folded flange portion 20 into the second pipeline 14 from its upper end by means of more than one elastically deformable rod-like member; and releasing the folding of the flange portion 20 when the flange portion 20 reaches the inside of the first pipeline 12.

Subsequently, the cut-off member 10 is drawn to the upper end of the second pipeline 14, so that the flange portion 20 is engaged with the inner surface of the first pipeline 12.

Figure 5:
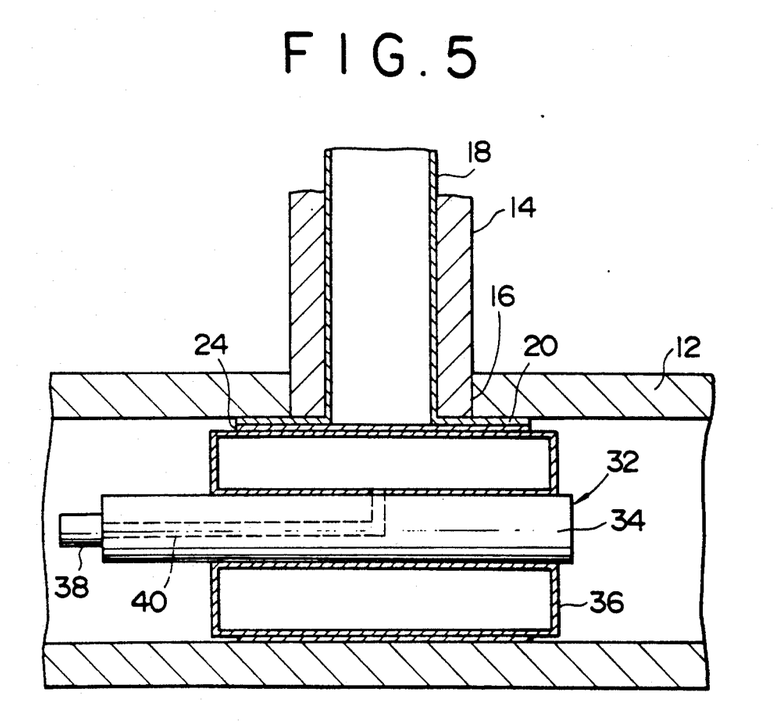
FIG. 5 is a cross-sectional view showing the pipeline installed with the cut-off member of FIG. 1 and the base of FIG. 4 together with an expanding machine for the base.

As shown in FIG. 5, the base 24 is then placed at the connection portion within the first pipeline 12 together with an expanding machine 32 to expand the base in the radial direction. The expanding machine 32 is provided with a shaft portion 34; an expansion portion 36 fixed to the shaft portion so as to extend continuously around the shaft portion and expanded like a floating ring by a pressure fluid such as compressed air; and a nipple 38 for the pressure fluid. A water-sealing machine under the trade name of "PACKER" manufactured by Toa Grout Kogyo Kabushiki Kaisha may be used as an expanding machine 32. FIG. 5 shows the expansion portion 36 in an expanded configuration resulting in radial expansion of the base 24.

The expanding machine 32 is placed within the base 24 when the expansion portion 36 is in a shrunken configuration. Subsequently, the expanding machine 32 is moved to a predetermined position within the first pipeline 12 together with the base 24 when the expansion portion 36 is expanded such that the base 24 does not displace against the expanding machine 32. This expansion is achieved by means of the pressure fluid supplied from a fluid source installed on the ground into the nipple 38 through a hose. A flow path 40 communicating with both the expansion portion 36 and the nipple 38 is formed in the shaft portion 34 of the expanding machine 32.

For instance, when the first pipeline 12 is sized such that an operator is unable to enter, the base 24 and the expanding machine 32 are moved to a predetermined position within the first pipeline 12 by passing a rope through between the one end and the other end of the first pipeline 12; by connecting the rope to the expanding machine 32 at the other end of the first pipeline 12; and by moving the rope to the one end of the first pipeline 12 by a determined distance. In this case, it is preferable that a television camera be installed on the expanding machine 32, and picture images generated by the television camera be monitored during movement of the base 24 and the expanding machine 32.

When the base 24 and the expanding machine 32 are moved to the predetermined position, the pressure fluid is supplied to the nipple 38 of the expanding machine 32, so that the expansion portion 36 is expanded. The base 24 is thereby radially expanded such that the ends of the sheet portion 26 slightly overlap, that is, such that the male engaging portion 30 extends beyond at least one of the female engaging portions 28. As a result, the flange portion 20 of the cut-off member 10 is pressed by the sheet portion 26 against the inner surface of the first pipeline 12, and the projections 22 of the flange portion 20 are elastically deformed.

After the pressure fluid within the expansion portion 36 is removed, the expanding machine 32 is removed. The base 24 is thereby shrunken by the restoring force of the projection 22 until the male engaging portion 30 is engaged with either of the female engaging portions 28. Thus, the flange portion 20 remains pressed by the base 24 against the inner surface of the first pipeline 12; the space between the inner surface of the first pipeline 12 and the flange portion 20 is maintained in liquid tightness; and the space between the flange portion 20 and the base 24 is maintained in air tightness.

Subsequently, the hose portion 18 of the cut-off member 10 is expanded, extended along the inner surface of the second pipeline 14, and hardened by heated air or light in the extended condition. Since the opening of the end of the hose portion 18 at the side of the first pipeline 12 is closed by the base 24, the hose portion 18 is expanded, for example, by feeding the compressed air from the other end.

Figure 6:
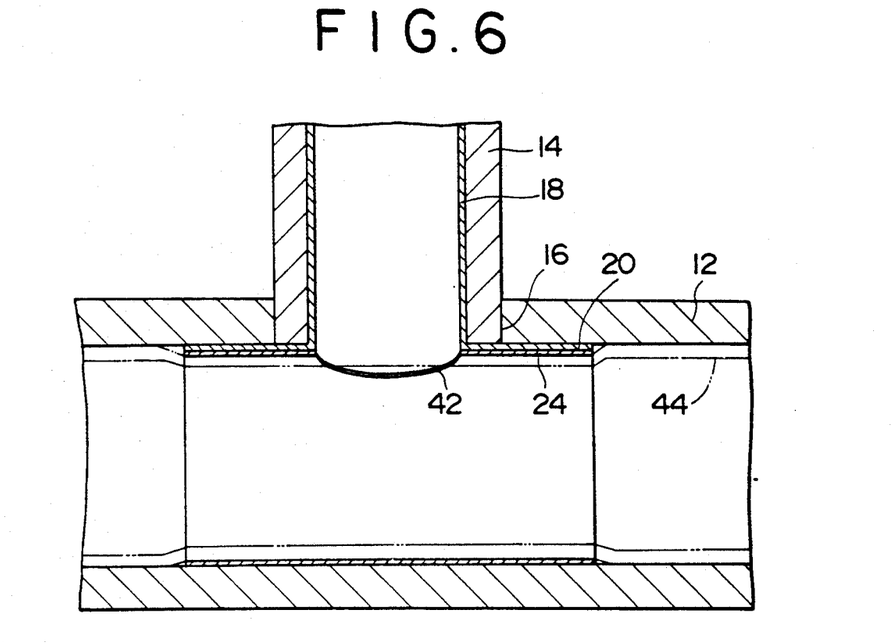
FIG. 6 is a cross-sectional view showing the condition of a hole formed in the base mounted on the pipeline.

As shown in FIG. 6, a predetermined portion of the base 24 is then bored by a known boring machine, such that the second pipeline 14 opens within the first pipeline 12. In this manner, a hole 42 is formed in the sheet portion 26 of the base 24 and permits communication between the first pipeline 12 and the second pipeline 14.

In order to place the cut-off member as mentioned above, for instance, a form memory alloy or a form memory resin is used. Form memory alloys or resins memorize the form of the portion where the flange portion 20 is disposed, in particular, the form of the inner surface of the first pipeline 14. The form memory alloy or resin is placed at the flange portion 20 during cut-off member placement, and is returned to its original form after the flange portion 20 is disposed within the first pipeline 12.

The flange portion 20 and the hose portion 18 may be bonded to the inner surfaces of the first and second pipelines 12 and 14, respectively, with an adhesive or the like. Such bonding may be achieved, for example, by coating the outer surfaces of the hose portion 18 and the flange portion 20 with a thermally fusible adhesive or by impregnating both the hose portion 18 and the flange portion 20 therewith, and fusing the adhesive while feeding heated air as the compressed air. Adhesives other than thermally fusible adhesives may also be used.

When a cylindrical coating layer, that is, a repair pipe portion 44, is formed at the inside of the first pipeline 12, the repair pipe portion 44 may be placed to hold the flange portion 20 and the base 24 between the first pipeline 12 and the repair pipe portion 44, as shown in FIG. 6. In this case, a hole allowing the second pipeline 14 to open within the first pipeline 12 is also formed in the repair pipe portion 44. The hole in the repair pipe portion 44 and the hole 42 in the base 24 may be formed at the same time.

Figure 7:
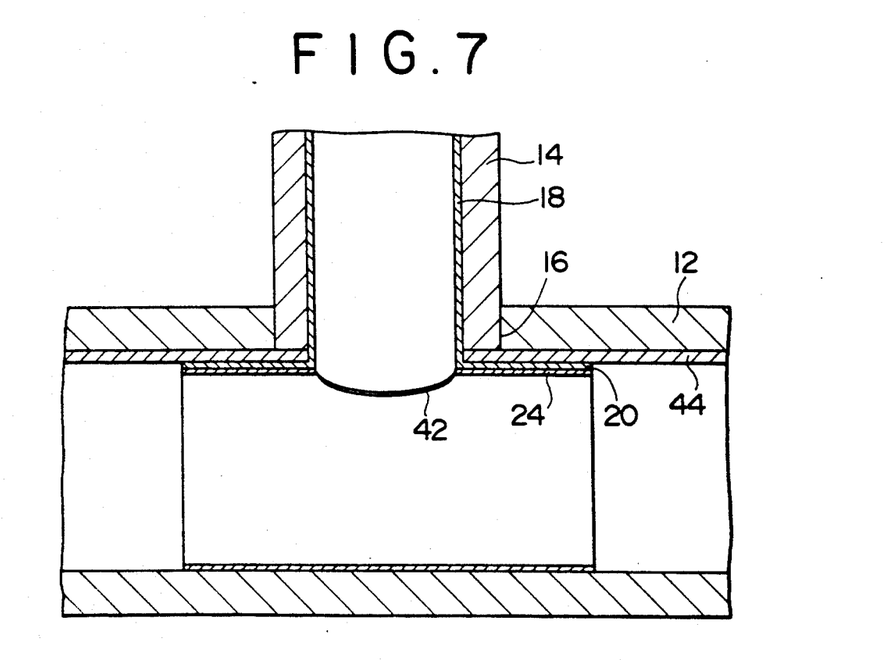
FIG. 7 is a cross-sectional view showing an embodiment of a repair pipe portion formed in the pipeline.

However, as shown in FIG. 7, it is preferable that the repair pipe portion 44 is formed within the first pipeline 12, and the hole allowing the second pipeline 14 to open within the first pipeline 12 is formed in the repair pipe portion 44, before placing the cut-off member 10 and the base 24. Since the portion defining the hole of the repair pipe portion 44 is located between the first pipeline 12 and the flange portion 20 in this manner, the portion is prevented from loss of contact with the inner surface of the first pipeline 12.

Figure 8:
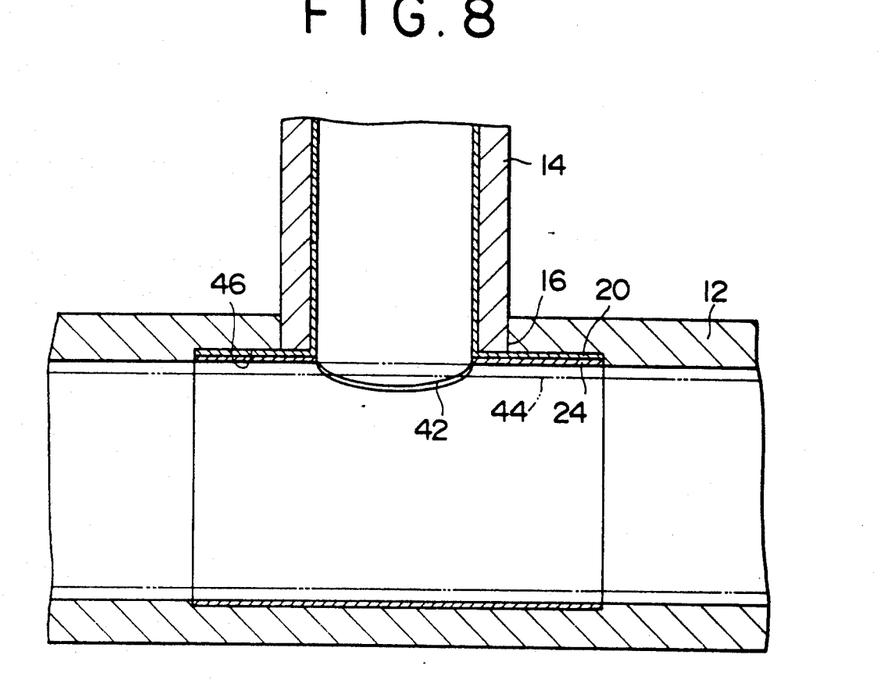
FIG. 8 is a cross-sectional view showing an embodiment of a cut-off structure when a recess is formed in the first pipeline.

As shown in FIG. 8, it is preferable that a recess 46 for receiving the flange portion 20 and the base 24 is formed on the inner surface of the first pipeline 12, before placing the cut-off member 10 and the base 24. In this manner, the flange portion 20 and the base 24 are prevented from protruding from the inner surface of the first pipeline 12.

Figure 9:
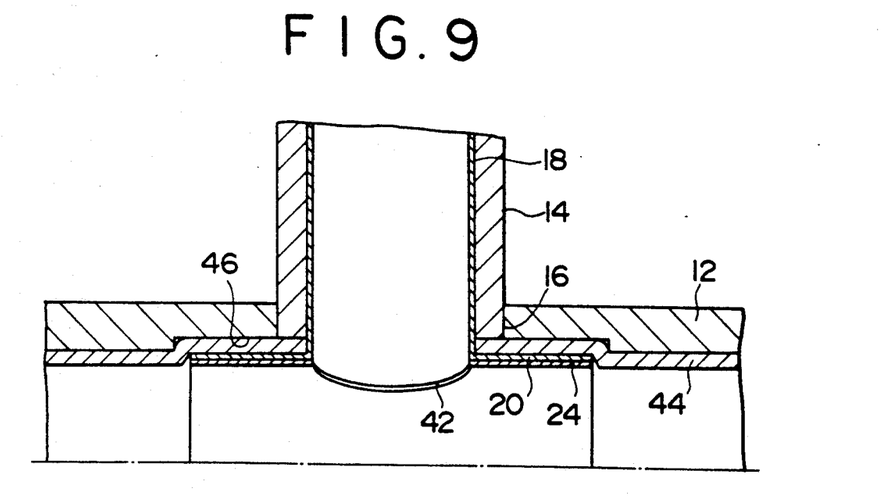
FIG. 9 is a cross-sectional view showing another embodiment of the cut-off structure when a recess is formed in the first pipeline.

When the recess 46 is formed in the pipeline 12, the repair pipe portion 44 may be formed within the first pipeline 12 after placing the cut-off member 10 and the base 24 as shown in FIG. 8 or before placing the cut-off member 10 and the base 24 as shown in FIG. 9.

Each projection 22 of the cut-off member 10 need not be of circular form. One or more of the projections may be of conical form or the like, so long as the base 24 is elastically deformed to facilitate engagement of the female engaging portion 28 of the base 24 with the male engaging portion 30 of the base 24 when the base 24 is expanded. Instead of forming projections in the cut-off member 10, the thickness of the flange portion 20 may be enlarged.

Figure 10:
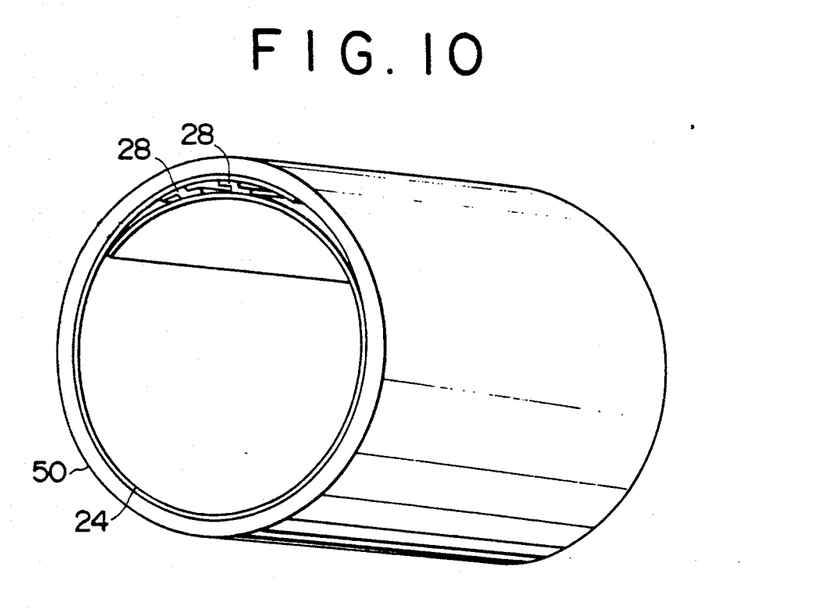
FIG. 10 is a perspective view showing a base and a sleeve.

Another alternative to forming projections in the cut-off member 10, a sleeve 50 shown in FIG. 10 may be used. The sleeve 50 shown in FIG. 10 is made of an elastically deformable material like rubber, and has an outer diameter that is smaller than the inner diameter of the first pipeline 12.

When the sleeve 50 is used, the base 24 is placed within the sleeve 50 in a cylindrically wound condition that is radially expandable as shown in FIG. 10. The base 24 and the sleeve 50 are then placed in the expanding machine 32 shown in FIG. 5, and moved to the predetermined position within the first pipeline. The base 24 and the sleeve 50 are radially expanded by expanding the expansion portion 36 of the expanding machine 32.

Figure 11:
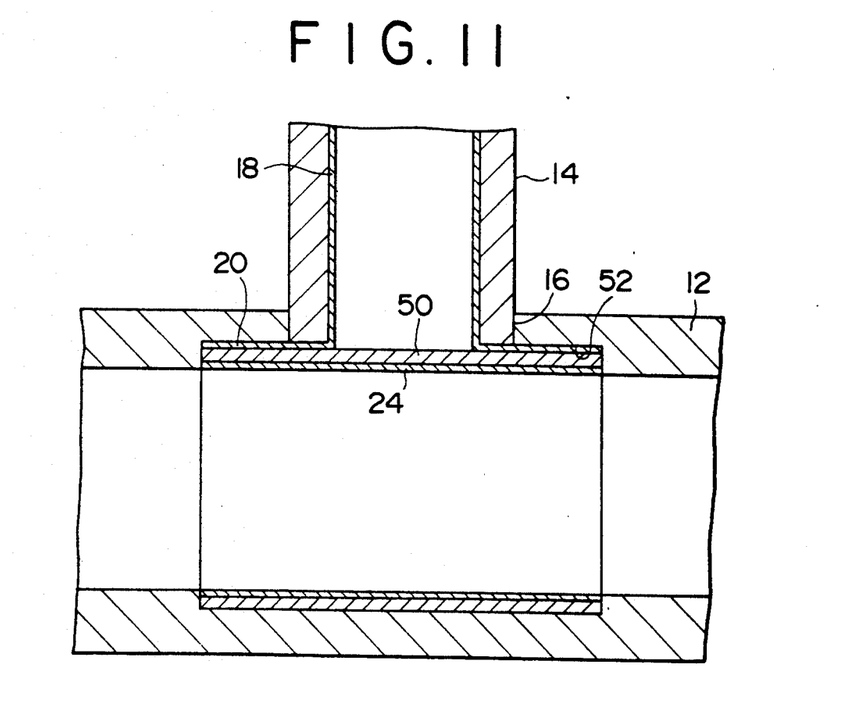
FIG. 11 is a cross-sectional view of the pipeline installed with the base and the sleeve shown in FIG. 10.

In this manner, the sleeve 50 is elastically deformed to press the flange portion 20 of the cut-off member 10 against the inner surface of the first pipeline 12 as shown in FIG. 11. When the expansion portion 36 of the expanding machine 32 is shrunken, the sleeve 50 causes the base 24 to shrink slightly so that the male engaging portion of the base 24 becomes engaged with either of the female engaging portions.

The expanding machine 32 is then removed, and a hole is bored in the base 24 and the sleeve 50 to open the second pipeline 14 to the first pipeline 12. It is preferable that a recess 52 for receiving the flange portion 20, the sleeve 50 and the base 24 is formed on the inner surface of the first pipeline 12.

As the female engaging portion of the base 24, use may be made of a hole formed in the sheet portion 26, a deformed tongue piece of the portion formed by striking a portion of the sheet portion 26 from one side of the surface to the other side or other different engaging portions. The male engaging portion may be any convenient engaging portion such as a projection.

Figure 12:
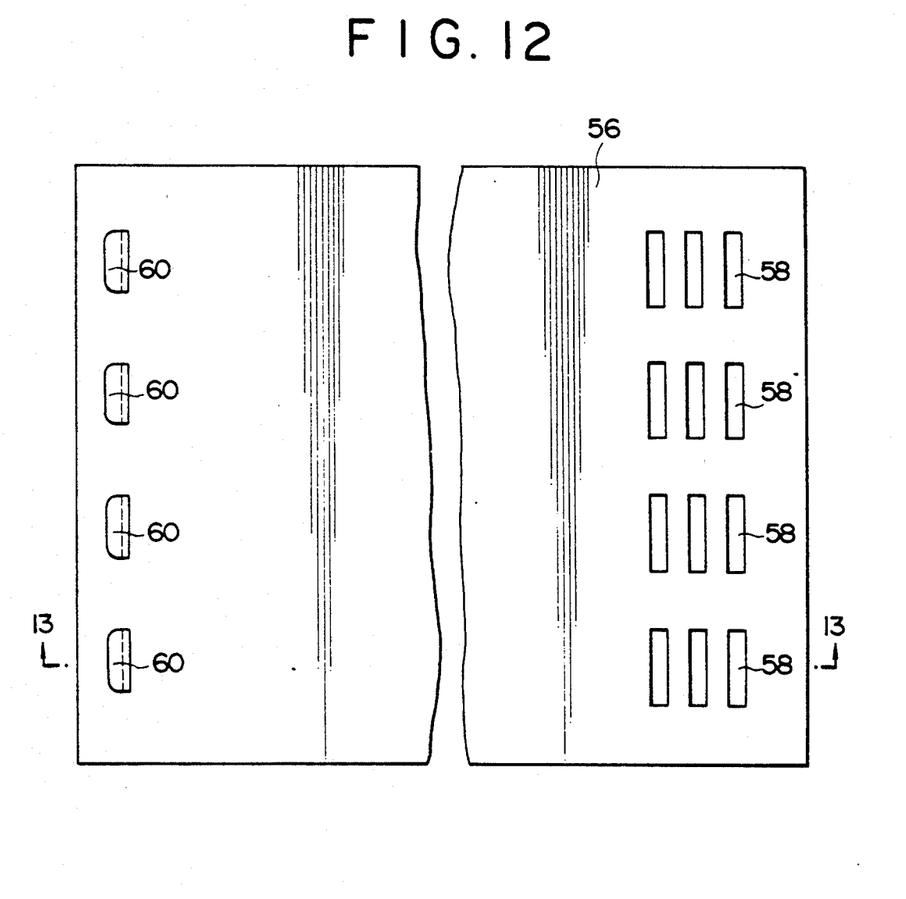
FIG. 12 is an extended view showing another embodiment of the base.
Figure 13:
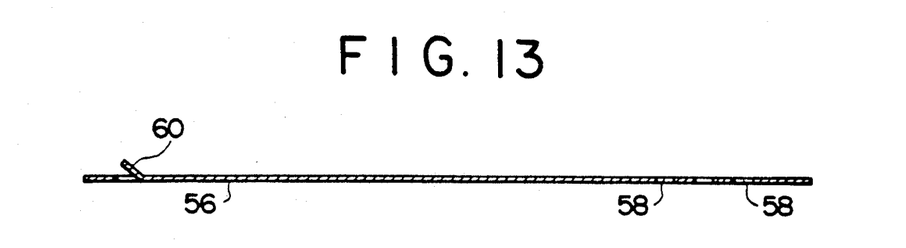
FIG. 13 is a cross-sectional view taken along line 13—13 in FIG. 12.
Figure 14:
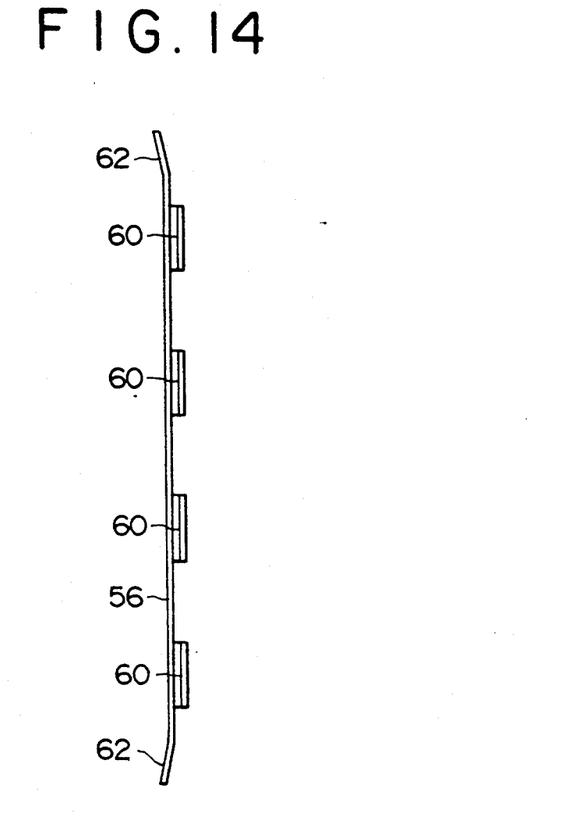
FIG. 14 is a left side view of the base shown in FIG. 12.

Each individual female engaging portion 58 of the base 54 shown in FIGS. 12 to 14 is one of a plurality of holes formed in a matrix configuration at one end of the sheet portion 56, and each individual male engaging portion 60 is one of a plurality of tongue pieces formed by striking the other end of the sheet portion 56 from one side to the other side. Both rim portions 62 in the width direction of the sheet portion 56 are bent in the opposite direction from the male engaging portions 60.

The base 54 is used in the radially expandable, cylindrically wound configuration, so that the male engaging portion 60 is located inside of the female engaging portion 58. Rim portions 62 prevent the ends of the sheet portion 56 from relatively displacing in the width direction of the sheet portion 56, when the base 54 is radially expanded.

The projection(s) formed in the flange portion of the cut-off member may be located on the surface beside the hose portion, the surface opposite thereto or both. An embodiment of the cut-off member having projections formed on the surface at the side of the hose portion is shown in FIGS. 15 and 16.

Figure 15:
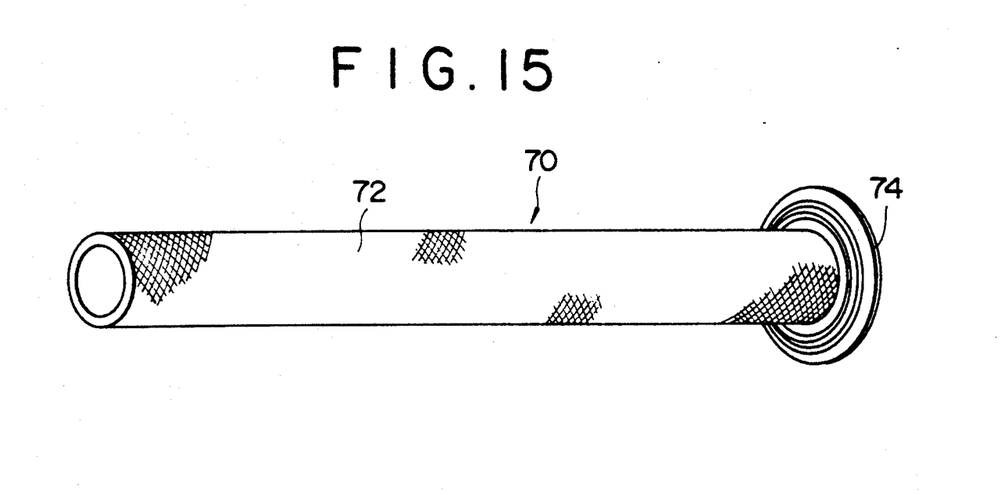
FIG. 15 is a perspective view showing another embodiment of the cut-off member according to the present invention.
Figure 16:
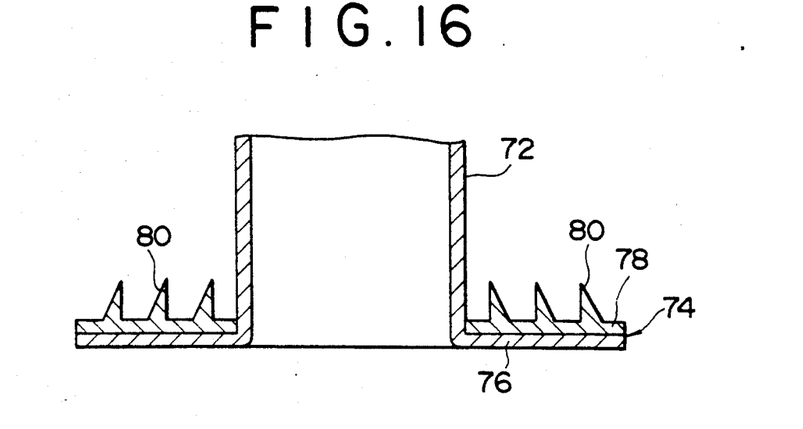
FIG. 16 is an enlarged cross-sectional view showing the neighborhood of a flange portion of the cut-off member shown in FIG. 15.

A cut-off member 70 shown in FIGS. 15 and 16 has an expandable hose portion 72 and an elastically deformable flange portion 74 formed integrally with one end of the hose portion. The flange portion 74 is provided with a main portion 76 extending the end of the hose portion 72 in the radial direction and an auxiliary member 78 installed at the side of the hose portion 72 in the main portion 76.

The hose portion 72 and the main portion 76 are manufactured by impregnating an expandable base material, which is composed of fabrics, knittings, sponge-like raw materials or the like, formed into a hose-like shape, with a resin characterized by hardening upon exposure to heat, light or the like, in particular, ultraviolet light. The auxiliary member 78 is made of an elastically deformable plate material as rubber, and has a plurality of projections 80 extending continuously around the axis of the hose portion 72 on its surface at the side of the hose portion 72.

The hole for permitting communication between the first and second pipelines may be formed in the base before the flange portion of the cut-off member is brought into liquid tight contact with the inner surface of the first pipeline. An embodiment of such a base is shown in FIGS. 17 and 18.

Figure 17:
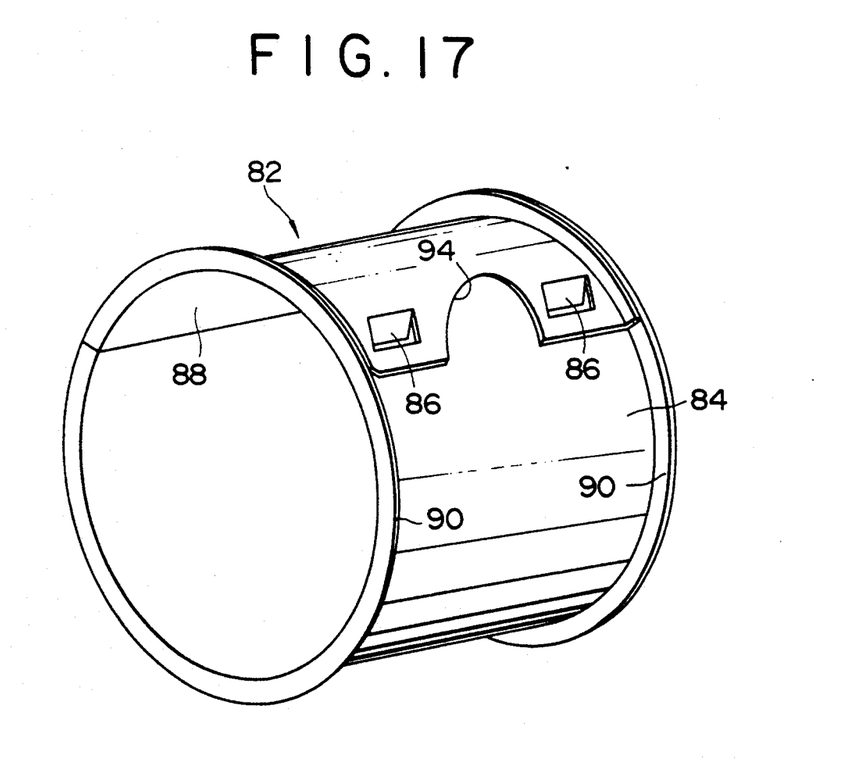
FIG. 17 is a perspective view showing a further embodiment of the base.
Figure 18:
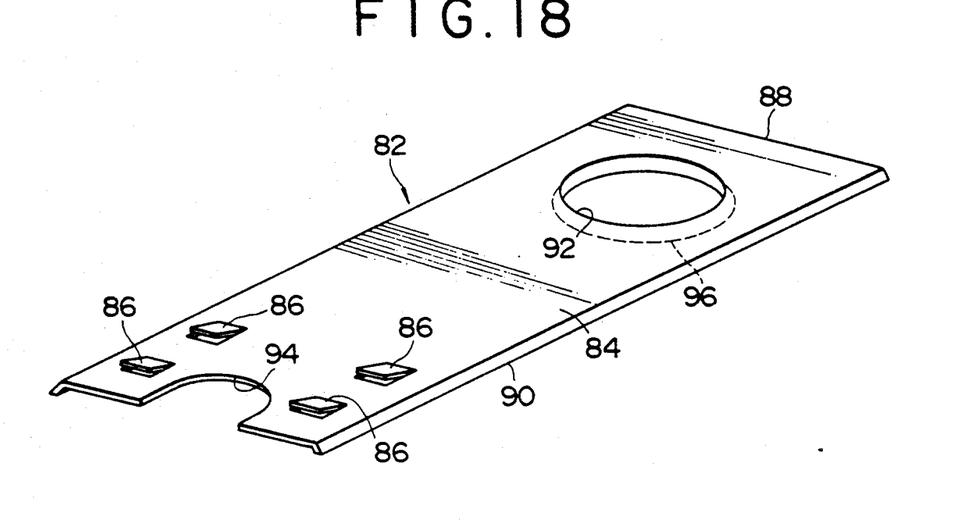
FIG. 18 is a perspective view showing the expanded configuration of the base shown in FIG. 17.

The base 82 shown in FIGS. 17 and 18 has an elastically deformable sheet portion 84; a plurality of female engaging portions 86 formed at one end of the sheet portion 84; a male engaging portion 88 formed at the other end of the sheet portion 84 capable of engaging with the female engaging portion 86; and a rim portion, that is, a bent portion 90, continuously extending over the longitudinal length of the sheet portion 84 at both rim portions in the width direction of the sheet portion 84.

In the sheet portion 84, a circular hole 92 is formed at the side of the male engaging portion 88, and a semicircular notch 94 is formed at the side of the female engaging portion. The hole 92 and the notch 94 have a radius of curvature approximately equal to one half of the inner diameter of the second pipeline 14. A portion 96 defining the hole 92 is bent in the same direction as the bent portion 90.

In the illustrated embodiment, the female engaging portion 86 is a tongue piece formed by striking a portion of the sheet portion 84 toward the side opposite the bent portion 90. The male engaging portion 88 constitutes the other end of the sheet portion 84.

As shown in FIG. 17, the base 82 is wound in a spiral form preliminarily having a diameter smaller than the inner diameter of the first pipeline 12, that is, in a cylindrical form. The end of the sheet portion 84 at the location of the female engaging portion 86 is positioned outside of the end at the location of the male engaging portion 88. When the base 82 is wound in a cylindrical form, the bent portion 90 is directed radially outward.

The base 82 has an inner diameter approximately equal to that of the first pipeline 12 when the female engaging portion 86 is engaged with the male engaging portion 88. The length of the base 82 in the axial direction is slightly larger than the diameter of the flange portion of the cut-off member.

Figure 19:
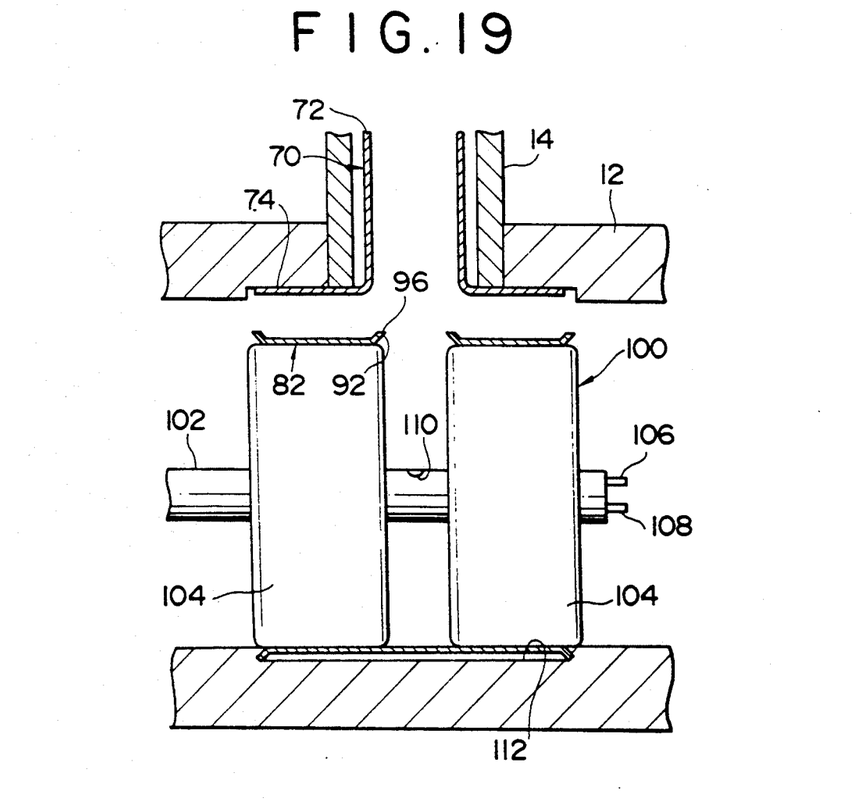
FIG. 19 is a cross-sectional view showing the base of FIG. 17 transferred into the pipeline together with the expanding machine.
Figure 20:
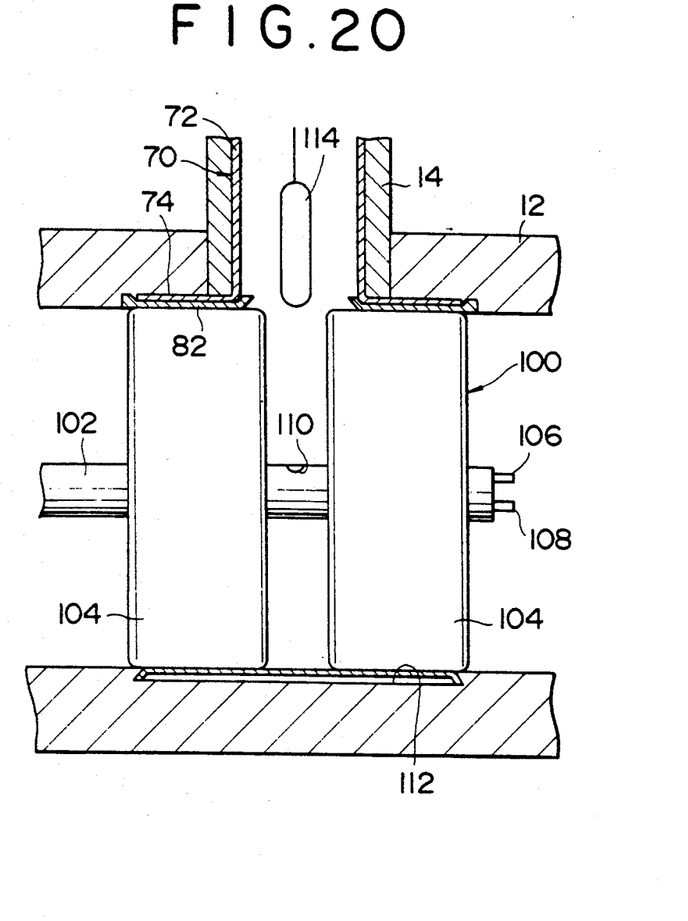
FIG. 20 is a cross-sectional view showing the base expanded in the radial direction within the pipeline.

When a cut-off process using the base 82, as shown in FIG. 19, is conducted, the base 82 is placed at the connection portion within the first pipeline 12 together with an expanding machine 100 used for radially expanding the base 82. FIGS. 19 and 20 show an embodiment using the cut-off member 70 in FIGS. 15 and 16.

The expanding machine 100 is provided with a shaft portion 102; a pair of expansion portions 104 fixed to the shaft portion, so as to extend continuously around the shaft portion 102 and expand like a floating ring through the action of a pressure fluid such as compressed air; and a pair of nipples 106 and 108 to receive the pressure fluid from a hose (not shown). The nipple 106 communicates with both expansion portions 104 through a flow path (not shown), and the nipple 108 is located between both expansion portions 104 and communicates with an opening 110 formed in the shaft portion 102 through a flow path (not shown).

As the expanding machine 100, a water-sealing machine having the trade name "PACKER" manufactured by Toa Grout Kogyo Kabushiki Kaisha may be used.

The expanding machine 100 is disposed within the base 82 with the expansion portion 104 in a shrunken configuration. The expanding machine 100 is then moved to a predetermined position within the first pipeline 12 together with the base 82, and the expansion portion 104 is radially expanded by the pressure fluid supplied from a fluid source installed on the ground into the nipple 106 through a hose, such that the base 82 does not displace against the expanding machine 100.

The base 82 and the expanding machine 100 are positioned, so that the hole 92 of the base 82 faces the lower end opening of the cut-off member 70 when the center of the hole 92 of the base 82 is placed between the expansion portions 104 of the expanding machine 100. In this configuration, the pressure fluid is supplied to the nipple 106 of the expanding machine 100, so that the expansion portion 104 is further radially expanded.

Figure 21:
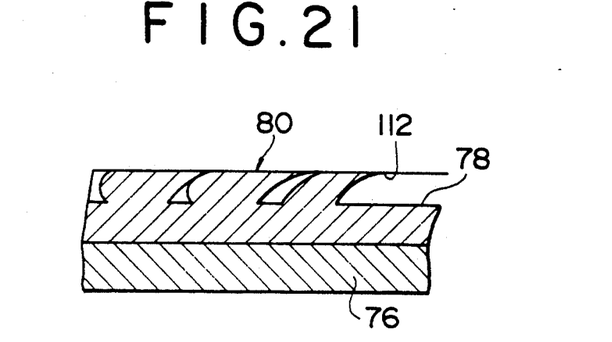
FIG. 21 is a cross-sectional view showing a deformed projection of the cut-off member shown in FIG. 15.

In this manner, the base 82 is expanded such that the ends of the sheet portion 84 slightly overlap, that is, that the male engaging portion 88 is capable of engaging with either of the female engaging portions 86. As a result, the flange portion 74 and the base 82 of the cut-off member 70 are disposed in a recess 112 that is preliminarily formed on the inner surface of the first pipeline 12, as shown in FIG. 19. The projections 80 of cut-off member 70 are pressed against the inner surface of the first pipeline 12 by the sheet portion 84 as shown in FIG. 20 and deformed elastically as shown in FIG. 21.

When the male engaging portion 88 is engaged with either of the female engaging portions 86 by the restoring force of the projections 80, the pressure fluid within the expansion portion 104 is removed, and the base 82 assumes a shrunken configuration. As a result, the projections 80 are maintained pressed against the inner surface of the first pipeline 12 by the base 82, and the space between the inner surface of the first pipeline 12 and the flange portion 74 and the space between the flange portion 74 and the base 82 are maintained in air tightness.

The pressure fluid is then supplied to the nipple 108 of the expanding machine 100, such that the cut-off member 70 is extended within the second pipeline 14; the end of the hose portion 72 is closed in air tightness; and the space between the expansion portion 104 and the base 82 is maintained in air tightness.

Since the pressure fluid is supplied into the cut-off member 70 from an opening 110 of the shaft portion 102. The cut-off member 70 is radially expanded, so that the hose portion 72 comes into contact with the inner surface of the second pipeline 14.

The cut-off member 70 is then hardened in the expanded configuration. This operation is performed by moving a hardening means 114, shown in FIG. 20 and preliminarily placed within the cut-off member 70, in the direction of the hose portion 72 within the cut-off member 70 at least once, while generating heat or light, in particular, ultraviolet light, by supplying electric power to the hardening means. The hardening means 114 may be moved within the hose portion 72 by use of a rope.

After the pressure fluid in the expansion portion 104 is removed, the expanding machine 100 is removed. In addition, the top end of the cut-off member 70 is opened; the hardening means 114 is removed therefrom; and that end of the cut-off member 70 is fixed to a manhole.

Since the base 82 is maintained such that the male engaging portion 88 is engaged with either of the female engaging portions 86 by the restoring force of the projections 80, the flange portion 74 remains pressed against the inner surface of the first pipeline 12 by the base 82, and the air tightness between the inner surface of the first pipeline 12 and the flange portion 74 and between the flange portion 74 and the base 82 is maintained.

As a result, the water leakage from the connection portion is prevented, and the water leakage from the second pipeline 14 is also prevented. As shown in FIG. 19, the flange portion 74 of the cut-off member 70 and the base 82 are disposed in a recess 112 that is preliminarily formed on the inner surface of the first pipeline 12.

The present invention is directed to a water cut-off member used for the connection portion of a pipeline sized such that an operator is unable to enter, but it may be also applied to a water cut-off member used for the connection portion of a pipeline sized to allow an operator to enter. The present invention may also be applied to water cut-off from the connection portions of pipelines other than sewerage pipelines. For example, the present invention is applicable to the portion connecting the main pipe in a pipeline used for a power line or a telephone line, i.e., the first pipeline and the branch pipe, i.e., the second pipeline.

What is claimed is:

1. A method for water cut-off at a branch connecting a first pipeline, having an inner surface and an outer surface, to a second pipeline that branches off from said first pipeline, comprising the steps of:
    disposing an impermeable cut-off member having an expandable hose portion composed of a hose-like base material longer than the length of said second pipeline and impregnated with a resin to be hardened by heat or light and a flange portion continuous to an end of said hose portion and integral therewith, such that said flange portion is positioned within said first pipeline and said hose portion is positioned within said second pipeline; and
    maintaining said cut-off member, such that said flange portion is in liquid tight contact with the inner surface of said first pipeline and said hose portion is extended within said second pipeline;
    wherein the step for maintaining said cut-off member comprising the steps of;
    disposing a sheet-like base, wound in a radially expandable cylindrical form, in said first pipeline, said sheet-like base having a plurality of engaging portions and a hole matched with a branch connecting said first and second pipelines when said engaging portions are engaged with each other;
    pressing said flange portion against the inner surface of said first pipeline by radially expanding said base; and
    bringing said flange portion into liquid tight contact with the inner surface of said first pipeline by maintaining said base in a radially expanded form by engaging the plurality of engaging portions with each other.

2. A method for water cut-off according to claim 1, further comprising the step of forming a recess for receiving at least said flange portion and said base on the inner surface of said first pipeline, before disposing said cut off member.

3. A method for water cut-off according to claim 1, wherein the step of maintaining the cut-off member comprises the step of disposing said base within an elastically deformable sleeve, before disposing said base within said first pipeline, said sleeve pressing said flange portion against the inner surface of said first pipeline in collaboration with said base by a radial expansion of said base.

4. A method for water cut-off according to claim 3, further comprising the step of forming a recess for receiving at least said flange portion, said sleeve and said base on the inner surface of said first pipeline, before disposing said cut-off member.

5. A cut-off assembly to be used for water cut-off at a branch connecting a first pipeline, having an inner surface and an outer surface, to a second pipeline that branches off from said first pipeline, comprising:
    an impermeable cut-off member having an expandable hose portion with a hose like base portion impregnated with a resin to be hardened by heat or light and a flange portion formed integrally with an end of said hose portion; and
    a sheet-like base disposed within said first pipeline in a radially expandable, cylindrically wound form so as to maintain said flange portion pressed against the inner surface of said first pipeline;
    wherein said base has a plurality of engaging portions to be engaged with each other when said base is radially expanded for maintaining said base in a radially expanded condition and a hole matched with the branch connecting said first and second pipelines when said engaging portions are engaged with each other.

6. A cut-off assembly according to claim 5, wherein said flange portion includes a plurality of projections formed on at least one surface selected from a surface beside said hose portion and a surface opposite thereto.

7. A cut-off assembly according to claim 6, wherein said projections are annular projections extending continuously around the axis of said hose portion.

8. A cut-off assembly according to claim 5, further comprising an elastically deformable sleeve in which said base is received in a radially expandable, cylindrically wound condition, said sleeve maintaining said flange portion pressed against the inner surface of said first pipeline in collaboration with said base by a radial expansion of said base.

9. A cut-off assembly according to claim 5, wherein said flange portion is provided with a main portion formed by radially expanding an end of said hose portion and an elastically deformable auxiliary member portion attached to said main portion at the side of the hose portion, and wherein said projections are formed integrally with said auxiliary member.

* * * * *